United States Patent
Huang

(10) Patent No.: US 10,530,702 B2
(45) Date of Patent: Jan. 7, 2020

(54) SYSTEM AND METHOD TO EFFICIENTLY SERIALIZE PARALLEL STREAMS OF INFORMATION

(71) Applicant: Hughes Network Systems LLC, Germantown, MD (US)

(72) Inventor: Tony C. Huang, Germantown, MD (US)

(73) Assignee: HUGHES NETWORK SYSTEMS LLC, Germantown, MD (US)

(*) Notice: Subject to any disclaimer, the term of this patent is extended or adjusted under 35 U.S.C. 154(b) by 182 days.

(21) Appl. No.: 15/374,819

(22) Filed: Dec. 9, 2016

(65) Prior Publication Data

US 2018/0167332 A1 Jun. 14, 2018

(51) Int. Cl.
| | |
|---|---|
| *H04L 12/835* | (2013.01) |
| *H04L 12/861* | (2013.01) |
| *H04B 7/185* | (2006.01) |
| *H04L 12/879* | (2013.01) |

(52) U.S. Cl.
CPC ......... *H04L 47/30* (2013.01); *H04B 7/18513* (2013.01); *H04L 49/9047* (2013.01); *H04L 49/901* (2013.01); *H04L 49/9005* (2013.01); *H04L 49/9031* (2013.01); *H04L 49/9057* (2013.01)

(58) Field of Classification Search
None
See application file for complete search history.

(56) References Cited

U.S. PATENT DOCUMENTS

| | | | | |
|---|---|---|---|---|
| 5,850,389 A * | 12/1998 | Wesler | ........ | H04L 12/433 370/325 |
| 5,862,175 A * | 1/1999 | Sugiyama | ....... | H04L 1/0042 370/335 |
| 8,315,269 B1 * | 11/2012 | Rajamanickam | ... | G06F 13/4027 370/419 |
| 2009/0086657 A1 * | 4/2009 | Alpert | ........ | H04L 1/1838 370/310 |
| 2011/0246599 A1 * | 10/2011 | Kawada | ....... | G06F 17/30575 709/212 |

\* cited by examiner

*Primary Examiner* — Saumit Shah
(74) *Attorney, Agent, or Firm* — Global IP Counselors, LLP

(57) ABSTRACT

A system and method for serializing parallel streams of information. The system and method employ a plurality of buffers and a controller. The plurality of buffers are configured to store information received from a demodulator and output the stored information to a decoder. The controller is configured to store a plurality of frames of information output in a parallel manner from the demodulator into the plurality of buffers, and control the output of the plurality of buffers such that each of the plurality of frames is output to the decoder once stored.

20 Claims, 7 Drawing Sheets

| QUEUE 72-1 | TOKEN 0 | | ... |
|---|---|---|---|
| QUEUE 76-1 | TIMESTAMP_0 | | ... |
| QUEUE 78-1 | PLSC_0 | | ... |
| QUEUE 80-1 | FRM_LEN_CU | | ... |

*FIG. 7*

| QUEUE 72-1 | TOKEN 1 | TOKEN 0 | ... |
|---|---|---|---|
| QUEUE 76-1 | TIMESTAMP_0 | TIMESTAMP_0 | ... |
| QUEUE 78-1 | PLSC_0 | PLSC_0 | ... |
| QUEUE 80-1 | FRM_LEN_CU | FRM_LEN_CU | ... |

*FIG. 8*

| QUEUE 72-1 | TOKEN 12 | TOKEN 32 | TOKEN 8 | ... |
|---|---|---|---|---|
| QUEUE 76-1 | TIMESTAMP_0 | TIMESTAMP_0 | TIMESTAMP_0 | ... |
| QUEUE 78-1 | PLSC_0 | PLSC_0 | PLSC_0 | ... |
| QUEUE 80-1 | FRM_LEN_CU | FRM_LEN_CU | FRM_LEN_CU | ... |

*FIG. 9*

SYSTEM AND METHOD TO EFFICIENTLY SERIALIZE PARALLEL STREAMS OF INFORMATION

BACKGROUND

Field of the Invention

The present invention generally relates to system and method to efficiently serialize parallel streams of data. More particularly, the present invention relates to a system and method that efficiently buffers information contained in parallelly demodulated carriers to serially provide the demodulated information to a forward error correction decoder. The system and method can be employed in any suitable device, such as a satellite communication terminal.

Background Information

Communication networks, such as satellite communication networks, generally include an application-specific integrated circuit (ASIC) or system on a chip (SOC) in components such a satellite user terminals, satellite gateways, and so on. As understood in the art, an ASIC or SOC typically includes demodulators and forward error correction (FEC) decoders for processing modulated carrier signals. Conventionally, an FEC decoder is connected to a single demodulator that processes a single modulated carrier.

SUMMARY

However, advanced SOCs, such as the Cosmo ASIC demodulator employed in the Jupiter 3 system by Hughes Network Systems, include demodulators that can process more than a single modulated carrier signals simultaneously. In a conventional configuration, one FEC would be used to process each carrier signal being output by the demodulator. Therefore, if the demodulator is configured to process and output two carrier signals, two FECs would be used. However, an FEC is power-intensive in that an FEC typically consumes a large amount of power compared to other components. An FEC is also area-intensive, meaning that the size of an FEC is often quite larger than other components.

Therefore, it is advantageous for a single high-throughput FEC to process multiple streams of data from multiple modulated carriers at symbol rates, which can be at the same symbol rates or at different symbol rates. Accordingly, a disclosed embodiment provides a data stream management device, which operates as serializer to pool multiple streams of data arriving at different symbol rates into a single FEC, thus maximizing the use of a high-performance FEC in a multi-carrier demodulator.

More particularly, disclosed embodiments provide a system and method for serializing parallel streams of information. The system and method employ a plurality of buffers and a controller. The plurality of buffers are configured to store information received from a demodulator and output the stored information to a decoder. The controller is configured to store a plurality of frames of information output in a parallel manner from the demodulator into the plurality of buffers, and control the output of the plurality of buffers such that each of the plurality of frames is output to the decoder once stored.

BRIEF DESCRIPTION OF THE DRAWINGS

Referring now to the attached drawings which form a part of this original disclosure:

FIGS. 7 through 9 are conceptual diagrams illustrating examples in which tokens and data are stored in queues in accordance with disclosed embodiments.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

As will now be described, disclosed embodiments provide a system and method to efficiently serialize parallel streams of data. The system and method can be employed in any suitable device, such as a satellite communication terminal.

Figure 1:
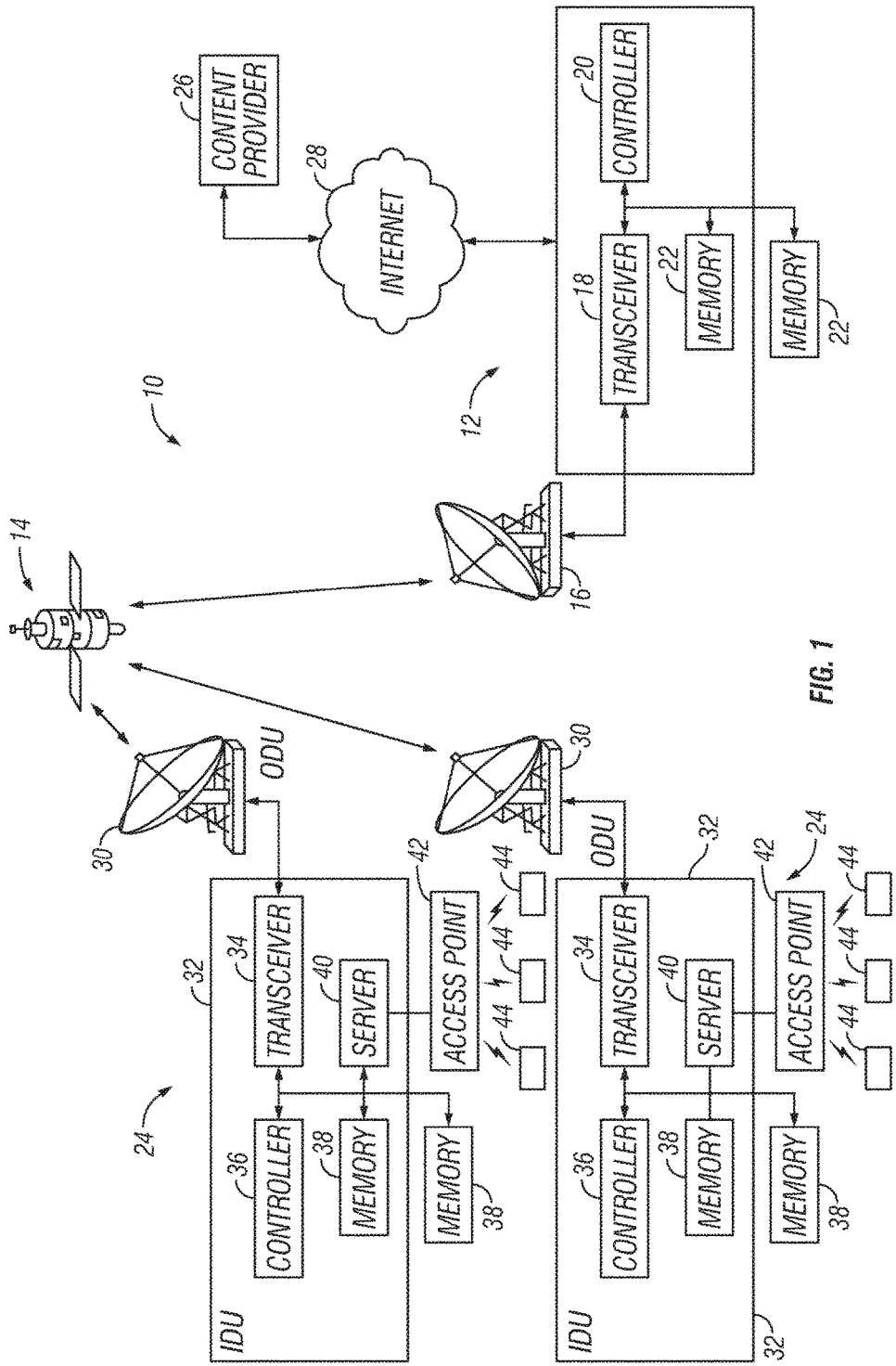
FIG. 1 illustrates an example of a satellite communication network in which a system for serializing parallel streams of information according to a disclosed embodiment is employed.

FIG. 1 illustrates an example of a satellite communication network 10 employing a system for serializing parallel streams of data according to an exemplary embodiment. A satellite communication network 10 typically includes a plurality of terrestrially mounted gateways 12 that communicate with one or more orbiting satellites 14. Each satellite gateway includes an antenna dish 16, a transceiver 18, a controller 20, a memory 22 and other types of equipment (not shown) such as amplifiers, waveguides and so on as understood in the art on which enable communication between the gateway 12 and a plurality of satellite user terminals 24 via one or more of the orbiting satellites 14. The memory 22 can be, for example, an internal memory in the gateway 12, or other type of memory devices such as flash memory or hard drives with external high speed interface such as a USB bus or an SATA bus, or remote memories such as cloud storage and so on. These other types of memory can be present at the gateway 12 or accessible at a location apart from the gateway 12 via a network connection such as an Ethernet connection, a WiFi connection or any other suitable type of connection as understood in the art.

As understood in the art, the controller 20 preferably includes a microcomputer with a control program that controls the gateway 12 as discussed herein. The controller 20 can also include other conventional components such as an input interface circuit, an output interface circuit, and storage devices such as a ROM (Read Only Memory) device and a RAM (Random Access Memory) device. The RAM and ROM store processing results and control programs that are run by the controller 20. The controller 20 is operatively coupled to the components of the gateway 12 as appropriate, in a conventional manner. It will be apparent to those skilled in the art from this disclosure that the precise structure and algorithms for the controller 20 can be any combination of hardware and software that will carry out the functions of the present invention.

The gateway 12, satellites 14 and satellite user terminals 24 typically communicate with each other over a radio frequency link, such as a Ku-band link, a Ka-band link or any other suitable type of link as understood in the art. Also, one or more of the gateways 12 can be configured as a network management center or network operating center which, among other things, operate to communicate with remote sites, such as web content providers 26, via the Internet 28, cloud storage, or other communication networks as understood in the art. In addition, the gateways 12 can communicate with each other via, for example, the Internet 28 or other communication networks.

As further shown in FIG. 1, a satellite user terminal 24 typically includes an antenna dish 30 that is commonly referred to as an outdoor unit (ODU), and a device such as a set-top box or other type of equipment that is commonly referred to as an indoor unit (IDU) 32. The IDU 32 typically includes a transceiver 34, a controller 36, a memory 38, a local server 40 and other types of equipment (not shown) such as amplifiers, waveguides and so on as understood in the art on which enable communication between the satellite user terminal 24 and one or more gateways 12 via one or more of the orbiting satellites 14. A transceiver 34 can include, for example, an integrated satellite modem and any other suitable equipment which enables the transceiver 34 to communicate with one or more of the orbiting satellites 14 as understood in the art. The memory 38 can be, for example, an internal memory in the satellite user terminal 24, or other type of memory devices such as a flash memory or hard drives with external high speed interface such as a USB bus or an SATA bus, or remote memories such as cloud storage and so on. These other types of memory can be present at the satellite user terminal 24 or accessible at a location apart from the satellite user terminal 24 via a network connection such as an Ethernet connection, a WiFi connection or any other suitable type of connection as understood in the art.

As with the controller 20 for a gateway 12, the controller 36 preferably includes a microcomputer with a control program that controls the satellite user terminal 24 as discussed herein. The controller 36 can also include other conventional components such as an input interface circuit, an output interface circuit, and storage devices such as a ROM (Read Only Memory) device and a RAM (Random Access Memory) device. The RAM and ROM store processing results and control programs that are run by the controller 36. The controller 36 is operatively coupled to the components of the satellite user terminal 24 as appropriate, in a conventional manner. It will be apparent to those skilled in the art from this disclosure that the precise structure and algorithms for the controller 36 can be any combination of hardware and software that will carry out the functions of the present invention.

The memory 38 can be, for example, an internal memory in the terminal 24, or other type of memory devices such as a flash memory or hard drives with external high speed interface such as a USB bus or an SATA bus, or remote memories such as cloud storage and so on. These other types of memory can be present at the terminal 24 or accessible at a location apart from the terminal 24 via a network connection such as an Ethernet connection, a WiFi connection or any other suitable type of connection as understood in the art. Also, the local server 40 can communicate with an access point 42, such as a WAP or any other suitable device, which enables the local server 40 to provide packets to end user devices 44 as discussed herein. Such end user devices 44 include, for example, desktop computers, laptop or notebook computers, tablets (e.g., iPads), smart phones, Smart TVs and any other suitable devices as understood in the art. Naturally, the communications between the local server 38, the access point 42 and the end user devices 44 can occur over wireless connections, such as WiFi connections, as well as wired connections as understood in the art.

Figure 2:
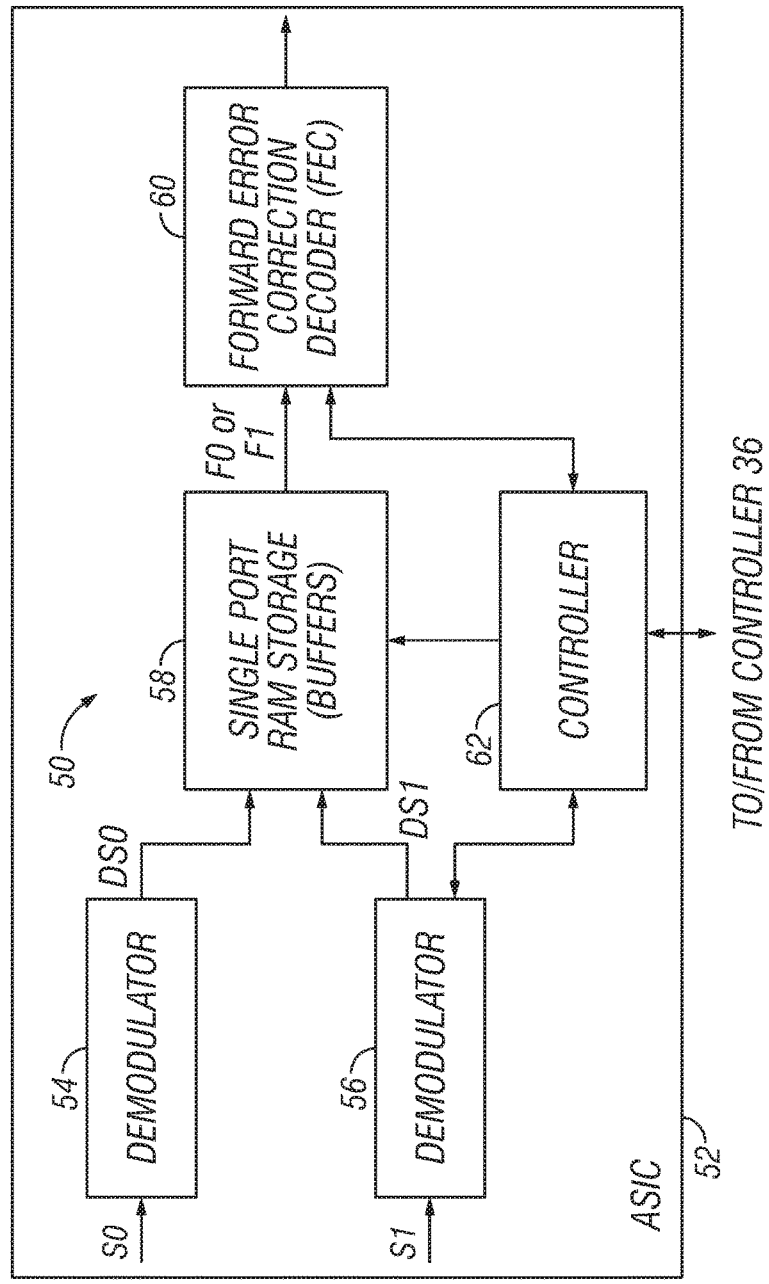
FIG. 2 is a conceptual block diagram illustrating an example of components of an ASIC disposed in a satellite terminal of the satellite communication network shown in FIG. 1, including a system for serializing parallel streams of information according to a disclosed embodiment.

FIG. 2 is a conceptual block diagram illustrating an example of components of an information serializing system 50 for serializing parallel streams of information according to an exemplary embodiment. In this example, components of the system 50 are included in an ASIC 52, and the ASIC 52 is included in the satellite user terminal 24. More specifically, the ASIC 52 in this example is employed in or associated with the transceiver 34 of a satellite user terminal 24. However, the ASIC 52, and thus the system 50, can also be employed in or associated with the transceiver 18 of a gateway 12, or at any other suitable location in the satellite communication network 10. Moreover, as understood by one skilled in the art based on the description herein, the system can be employed in any suitable type of device in which there is a need or desire to convert parallel streams of information into serial streams of information.

As shown in FIG. 2, the system 50 includes two demodulators 54 and 56, a storage 58, an FEC decoder 60 and a controller 62. The storage 58 can be, for example, a single port RAM storage or any other suitable type of device. The controller 62 can include features similar to those of controller 20 and 36 as discussed above. Also, although in this example, the components of the system 50 are included in the ASIC 52. However, as understood in the art, all of these components need not be included in the ASIC 52. Furthermore, for purposes of this example, the system 50 is shown as having two demodulators 54 and 56 and a single FEC decoder 60. However, as can be understood by one skilled in the art from the description herein, the system 50 can be configured to include additional demodulators 54 and 56, additional storage 58, additional FEC decoders 60 and additional controllers 62. In particular, the system 50 can be configured to serialize a plurality of parallel streams of information being output three or more demodulators into a single information stream to be input into a single FEC decoder. Primarily, the system 50 can be employed to serialize any suitable number of parallel streams of information into one or more serial information streams that can be input into one or more devices. Generally speaking, the number of devices from which the parallel streams of information are output exceeds the number of devices into which the serialized information stream is to be input.

In this example, the ASIC 52 can be employed as part of Cosmo ASIC employed in the Jupiter 3 system by Hughes Network Systems. Thus, the demodulators 54 and 56 can be part of the Cosmo ASIC in which up to two carriers can be processed simultaneously by the two independent demodulators 54 and 56, which could operate at different symbol rates. However, since one FEC decoder 60 is available in the forward channel subsystem of the ASIC, the system 50 is employed as a serializer. As will now be described, the system 50 acting as a serializer efficiently buffers the two streams of data segmented in units of DVB-S2 frames, collates the frames on a first-come-first-serve basis, and provide the frames, one at a time, to the single available FEC decoder 60.

Figure 3:
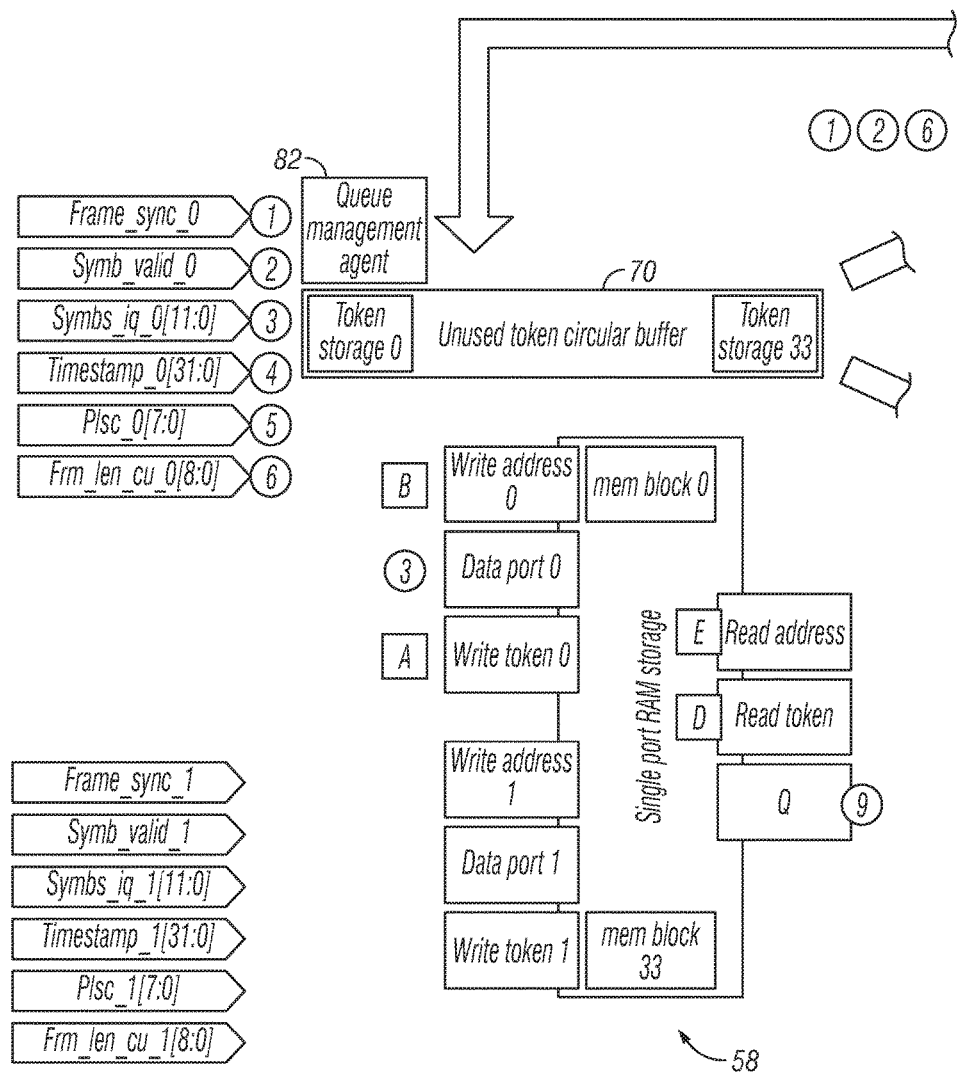
FIG. 3 is a conceptual block and flow diagram illustrating an example of components and operations associated with the system for serializing parallel streams of information according to a disclosed embodiment.
Figure 3:
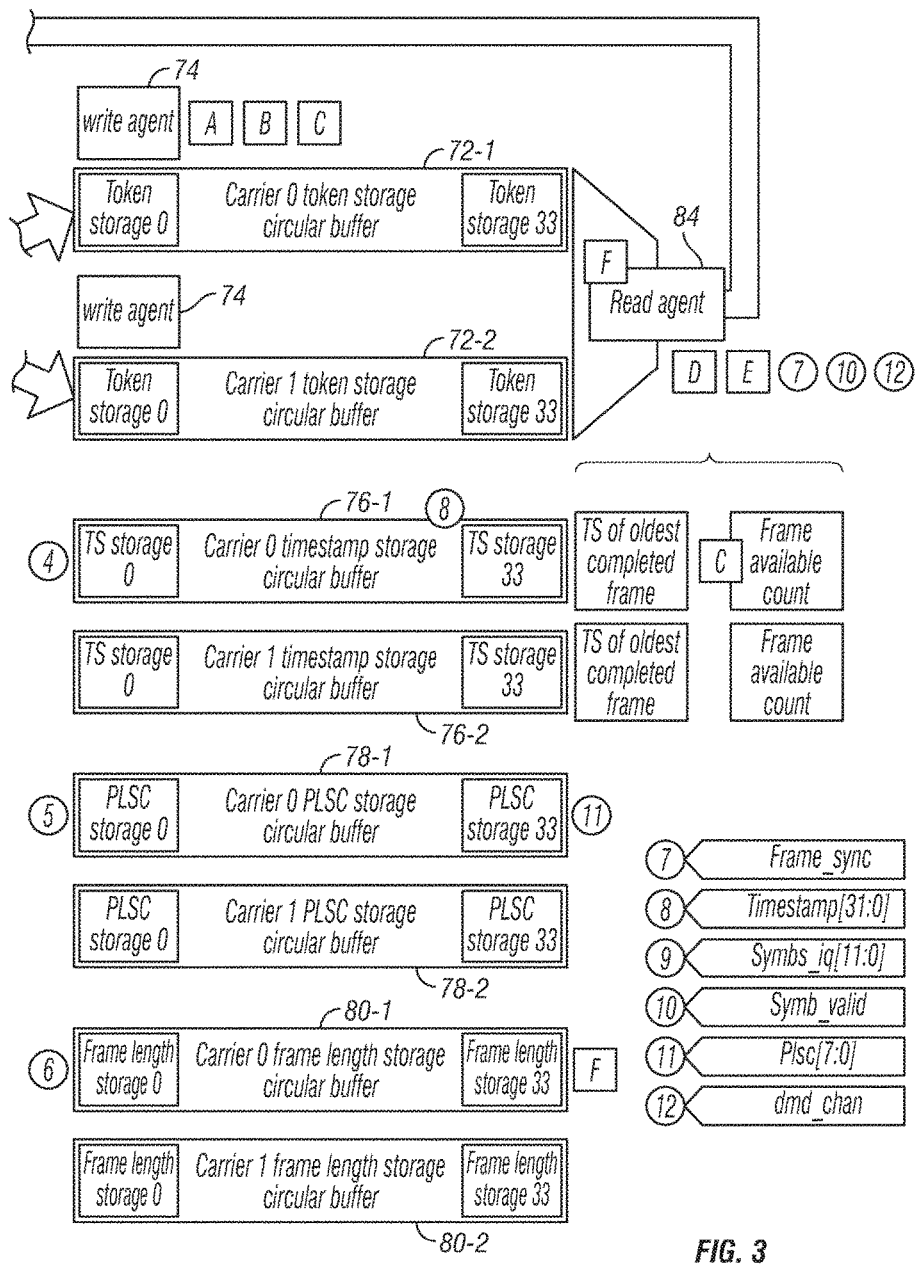
Figures 4, 5:
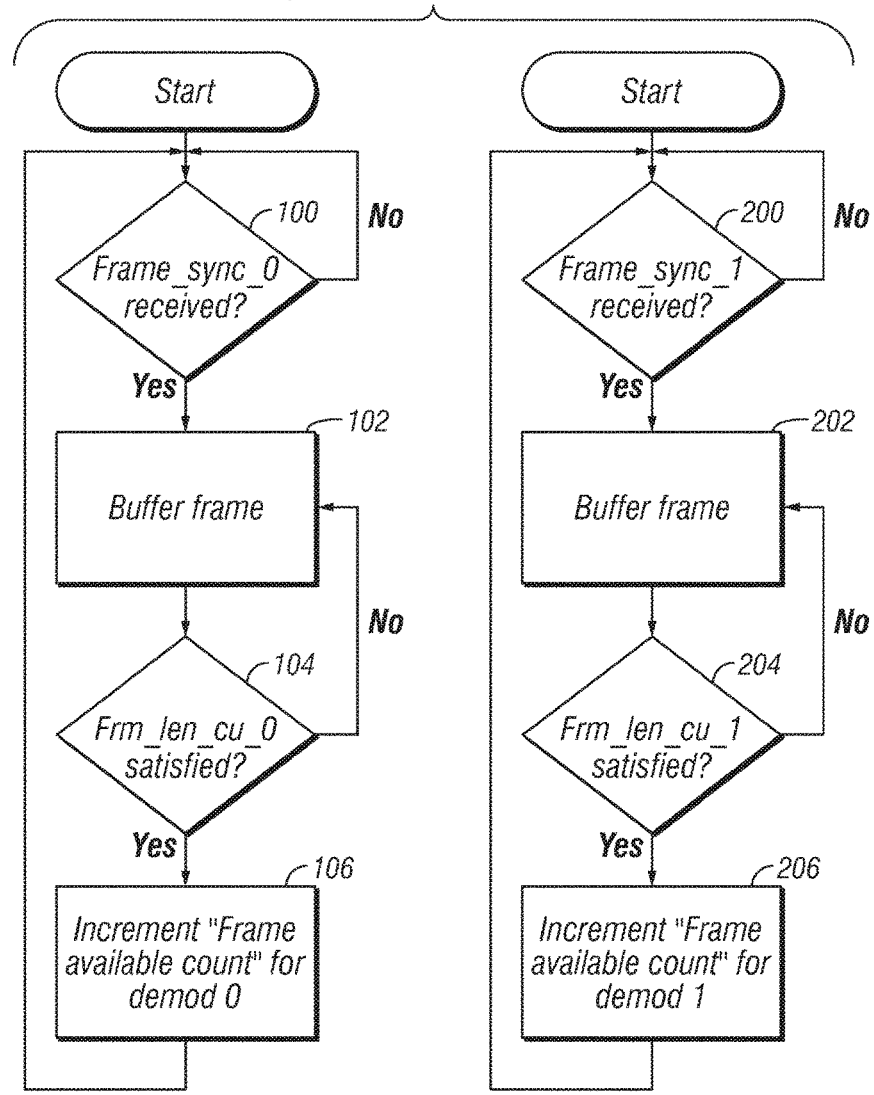
FIGS. 4 through 6 are flow charts illustrating an example of operations performed by the system for serializing parallel streams of information according to a disclosed embodiment.
Figure 6:
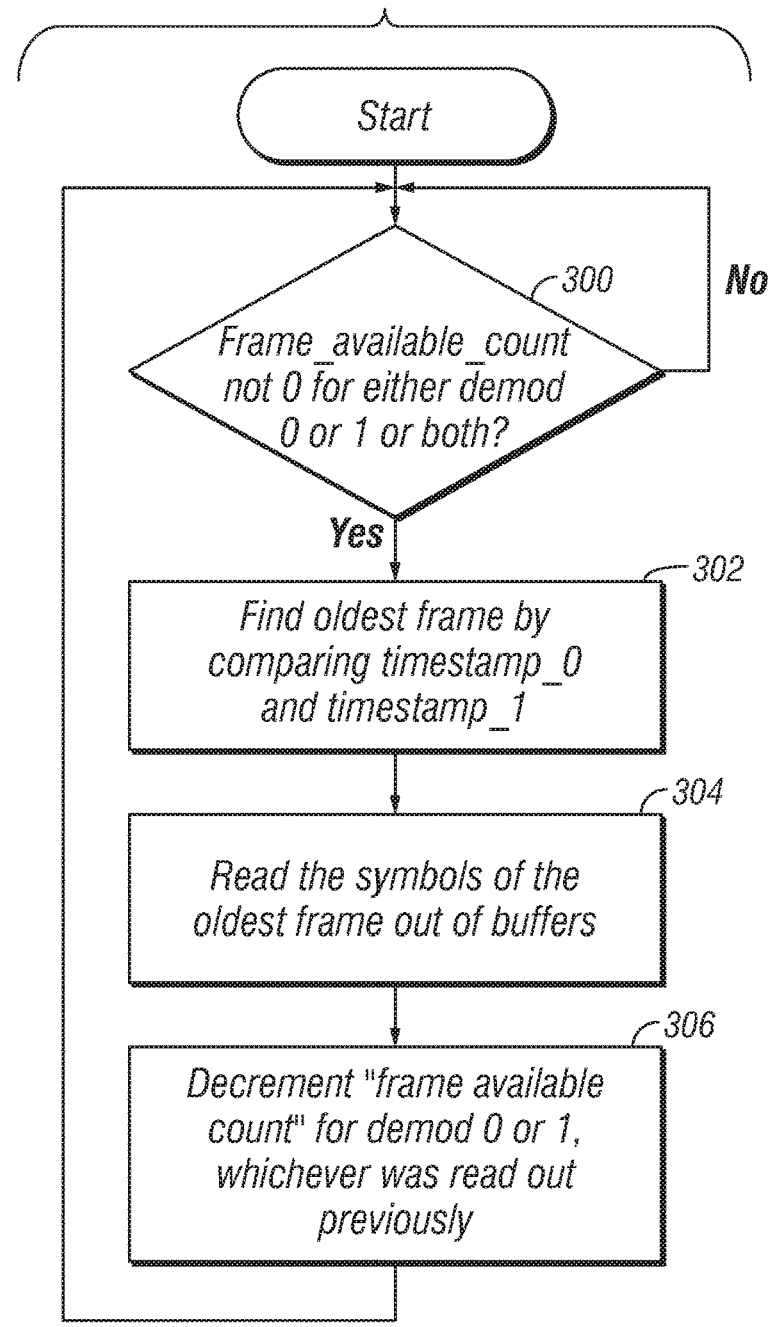

Further details of an example of the system 50 and an example of the operation of the system will now be described with reference to FIGS. 2 through 9. FIG. 3 is a conceptual block and flow diagram illustrating an example of components and operations associated with the system 50 for serializing parallel streams of information according to a disclosed embodiment. FIGS. 4 through 6 are flow charts illustrating an example of operations performed by the system 50 for serializing parallel streams of information according to a disclosed embodiment. FIGS. 7 through 9 illustrate examples of the tokens (e.g., buffer identification information) and related data being stored in the queues as discussed below. The operations described below with regard to FIGS. 2 through 9 can be performed by the controller 62 in this example, but naturally can be performed at least in part by another controller, such as controller 36 of the satellite user terminal 24.

As can be understood by one skilled in the art, before a frame of data can be provided to the FEC decoder 60, the frame is buffered because the FEC decoder 60 does not switch from one carrier's symbols to another until a completed frame of data is stored. Since it is unknown to the FEC decoder 60 which of the two carriers' frames arriving simultaneously will be completely received first, buffering both frames and providing the frame that is fully buffered first to the FEC decoder 60 is an efficient solution.

As shown in FIG. 3, the storage 58 in this example is configured as a 34 single-port memory blocks, identified as memory block 0 through memory block 33, for efficient storage of a variety of frame sizes. Naturally, the storage 58 can be configured to include any suitable number of memory blocks, and more than one storage 58 can be used. As will be appreciated by one skilled in the art from the description herein, the system 50 advantageously employs many small single-port buffers (e.g., 34 buffers) instead of a few large ones in the storage 58. The allocation of the minimum number of these buffers to store a frame of a particular size minimizes memory usage. Furthermore, because the buffers each has its read/write port, some buffers can be written to, while others are read from, all at the same time, similar to a large multi-port RAM but without the size penalty and without the logistics of partitioning the large multi-port RAM to store more than one frame of data.

Table 1 provides an example of storage requirements for various frame sizes for the data received by the transceiver 34 of a satellite user terminal 24 in this example. The three values identified by an asterisk "*" denotes short frames that are not a part of the DVBS-2 and DVBS-2X standard as understood in the art. Naturally, the system 50 can be configured to handle data having frame sizes other than those listed in Table 1 as understood by one skilled in the art.

TABLE 1

| Mod | Relative size | # buffers needed | |
|---|---|---|---|
| | | normal frame | Short frame |
| QPSK | 1 | 16 | 4 |
| 8PSK | 2/3 | 11 | 3 |
| 16APSK | 1/2 | 8 | 2 |
| 32APSK | 2/5 | 7 | 2 |
| 64APSK | 1/3 | 6 | 2* |
| 128APSK | 2/7 | 5 | 2* |
| 256APSK | 1/4 | 4 | 1* |

Referring to FIG. 2, carriers containing information streams (e.g., data streams) S0 and S1 segmented in units of DVB-S2 frames are demodulated by demodulators 54 and 56, respectively, and output by the demodulators 54 and 56 as demodulated streams DS0 and DS1, respectively. These demodulated streams DS0 and DS1 are provided to storage 58 as parallel streams.

As shown in FIG. 3, in this example 34 unique tokens are used for addressing buffers 0 through 33, configured as memory blocks in the storage 58, for reading and writing the demodulated streams DS0 and DS1. For purpose of this description, the terms "buffer" and "memory block" are used interchangeably. Likewise, the term "carrier" and "stream" are used interchangeably. Because of the uniqueness of the tokens used to address buffers 0 through 33, it is physically impossible for the same memory block to be written to by both demodulated streams DS0 and DS1. In this example, a queue 70, which can be a memory section in storage 58 or in any other suitable memory location, holds all the unused tokens, which correspond to unused memory blocks. Two additional queues 72-1 and 72-2 store tokens for frames that are currently being buffered, or have already been stored and awaiting read-out to the FEC decoder 60. As with queue 70, queues 72-1 and 72-2 can be configured as respective memory sections in storage 58 or in any other suitable memory location.

In this example, when the ASIC 52 is reset, one respective token is transferred from the unused queue 70 to each of the storage queues 72-1 and 72-2, awaiting the start of frame signal, indicated as 1 in FIG. 3 (frame_sync_0). For example, token 0 is transferred to storage queue 72-1 that is associated with carrier 0 received by demodulator 54, and token 1 is transferred to storage queue 72-2 that is associated with carrier 1 received by demodulator 56. In this example, the controller 62 can provide the start of frame signal when one of the demodulators 54 or 56 outputs a frame of a demodulated stream DS0 or DS1, or when a frame of a demodulated stream DS0 or DS1 arrives at the storage 58.

FIGS. 4 through 6 are flow charts illustrating an example of parallel operations performed by the system 50 for serializing parallel streams of information according to a disclosed embodiment. As can be understood from the descriptions herein, the controller 62 can control the operations shown in FIGS. 4 through 6.

As shown in Step 100 in FIG. 4 and in Step 200 in FIG. 5, when a frame arrives at the system 50 (i.e., at the serializer), the demodulator 54 or 56 at which the frame has arrived generates a frame_sync_0 (generated by demodulator 54) or frame_sync_1 signal (generated by demodulator 56), respectively, to indicate to the controller 62 of the system 50 when a frame has started. The terms Frame_sync_0 and Frame_sync_1 in this example, as shown in FIG. 3, each represents a level signal that is at a high state one clock per frame, which indicates that a received frame needs to be stored in a queue. For example, when a frame arrives at the demodulator 54 (also referred to as "demodulator 0" or simply "demod 0"), the demodulator 54 generates signal frame_sync_0. Similarly, when a frame arrives at the demodulator 56 (also referred to as "demodulator 1" or simply "demod 1"), the demodulator 56 generates signal frame_sync_1.

When a frame of a demodulated stream DS0 output by demodulator 54 arrives at the storage 58, the frame is buffered as indicated in Step 102 of FIG. 4. Likewise, when a frame of a demodulated stream DS1 output by demodulator 56 arrives at the storage 58, the frame is buffered as indicated in Step 202 of FIG. 5. For purposes of discussion, the example shown in FIG. 3 tracks the buffering and reading of a frame of demodulated stream DS0 that has been output by demodulator 54 to the storage 58. However, similar operations are performed for the buffering and reading of a frame of demodulated stream DS1 that has been output by demodulator 56 to the storage 58.

The write agent 74 provides the token to select a block of memory from among the 34 blocks of memory (buffers) as indicated by A in FIG. 3. As indicated by B in FIG. 3, the write agent 74 also provides the address of the block of memory corresponding to the block of memory designated by the token. In this example, the controller 62 can be programmed to perform the logic of the write agent 74 that governs the write operation of a carrier.

As further indicated in FIG. 3, the write agent 74, for example, can provide symbol valid data (symbvalid_0), indicated as 2 in FIG. 3, representing that the symbol in the frame is valid. The write agent 74 can also provide frame length data (Frm_len_cu_0), indicated as 6 in FIG. 3, representing the length of the frame, as well as the symbol iq (Symbs_iq_0), indicated as 3 in FIG. 3.

In this example, the terms Symbs_iq_0[11:0] and Symbs_iq_1[11:0] as shown in FIG. 3 represents the symbols of the frame in complex form. As would be understood by one skilled in the art, each of the data represented by the terms Symbs_k_0[11:0] and Symbs_iq_1[11:0] has a real component (I) and an imaginary component (Q), and each component in this example is 12 bits long, but can be any suitable bit length. In this example, the 12 bit length is not significant for serializing parallel streams of data, but rather is used for generating a soft decision for the FEC decoder 60, particularly when supporting higher modulation modes, such as 256APSK, which are among the modulation modes supported by the Cosmo ASIC. For instance, in the Cosmo ASIC, the storage 58 can output the frames to a soft-decision generator block (not shown), which can include a look-up table based on which the soft-decision generator block feeds soft decisions to the FEC decoder 60 as would be understood by one skilled in the art.

The controller 62 can determine the length of the frame is based on the frame length information Frm_len_cu_0[8:0] (demodulator 54) or Frm_len_cu_1[8:0] (demodulator 56), which is presented in units of capacity unit (CU). In this example, each CU is 90 symbols, and all frame types have number of symbols that is divisible by 90. However, the system 50 is operable for frames having any suitable number of symbols. In an information stream S0 and S1, an end of a frame can be the beginning of the next frame. However, as understood in the art, frames do not always arrive at a demodulator 54 or 56 back-to-back consecutively, and the system 50 (e.g., the Cosmo ASIC) can handle traffic in bursts. The frame length information Frm_len_cu_0[8:0] (demodulator 54) and Frm_len_cu_1[8:0] (demodulator 56) also prevents the system 50 from waiting for a Frame_sync_0 (or Frame_sync_1) signal of the next frame to indicate end the current frame, which could result in an error if symbols simply stop being received (e.g., the symb_valid_0 or symb_valid_1 signal goes low), which can occur during traffic bursts.

Also in this example, the bit width of the data Timestamp_0[31:0] and Timestamp_1[31:0] are used to prioritize two frames that can be in the storage 58 and awaiting read-out. If the data Timestamp_0[31:0] and Timestamp_1[31:0] has too few bits, then that Timestamp with too few bits is ambiguous as to which frame arrived earlier and which frame arrived later. Hence, in this example, the period of each of the data Timestamp_0[31:0] and Timestamp_1[31:0] is twice or more of the longest wait time of the system 50 (the serializer). In the Cosmo ASIC, for example, each of the values for Timestamp_0[31:0] and Timestamp_1[31:0] can count up from 0 to $2^{32}-1$, but the timestamps can be configured to have any suitable number of bits. In the example of the Cosmo ASIC, if the absolute value of the difference in value between timestamps of two frames equals or exceeds $2^{31}$, then the timestamp with the higher value is assumed to be older than the timestamp with the lesser value. Otherwise, the timestamp with the higher value is assume to be newer than the timestamp with the lesser value.

In addition, each of the signals Plsc_0 and Plscd_1 in this example represent physical-layer signaling. Each the signals Plsc_0 and Plscd_1 indicates whether a PL frame has pilots, whether the frame is a normal or short frame, whether the frame is QPSK, 8PSK, 16APSK, and so on, as is unique to the DVB-S2 protocol as would be understood by one skilled in the art.

In this example, the signals Symb_valid_0 and Symb_valid_1 are high for the number of clocks it takes for data to move into the system 50 (the serializer). Each of the signals Symb_valid_0 and Symb_valid_1 corresponds to a respective frame length information as represented in CUs as discussed above, or an error condition would occur. On the output side of the system 50, the read agent 84 discussed below generate the signals Symb_valid_0 (or Symb_valid_1), and holds the signal Symb_valid_0 (or Symb_valid_1) high until a frame is pushed out of the storage 50 (i.e., out of the serializer). The symbols of a frame are pushed out at clock speed, so this signal Symb_valid_0 (or Symb_valid_1) is high for the duration of the transfer of the frame to the FEC decoder 60. The controller 60 can use this signal Symb_valid_0 (or Symb_valid_1) to inform the next block of memory in storage 58 to start storing data.

In addition, the data Dmd_chan as shown in FIG. 3 can be 0 or 1 in this example, which represents demodulator 54 (e.g., Dmd_chan=0) or demodulator 56 (e.g., Dmd_chan=0), and thus informs the FEC decoder 60 which demodulator 54 or 56 supplied the frame that the FEC decoder 60 is currently decoding. Naturally, the values of Dmd_chan can be larger when additional demodulators are present in the system 50. For example, if the system 50 includes 4 demodulators, the values of Dmd_chan can be from 0 to 3. Thus, the bit-width of Dmd_chan can correspond to the number of sources of input to the system 50.

Turning back to the flowchart shown in FIG. 4, in Step 102, the write agent 74 begins writing a frame that has arrived at the storage 58 from demodulator 54 into one of the blocks of memory in storage 58 corresponding to the block of memory designated by the token. As mentioned, although the example shown in FIG. 3 tracks the buffering and reading of a frame provided from demodulator 54, operations similar to those discussed below are performed in Step 202 in FIG. 5 for a frame provided from demodulator 56. In this example, the first part of the frame can be written into memory block (buffer) 0 of the 34 memory blocks. In addition, the write agent 74 stores a time stamp (Timestamp_0), indicated as 4 in FIG. 3, in a separate queue 76-1 that is associated with carrier 0. The time stamp provides an indication of the time at which the frame arrived at the demodulator 54. The frame timestamps are stored alongside the symbols of the frame in queue 76-1 so that the two can be serialized at the same time as the symbols of the frame are being buffered. Thus, the timestamps are used by the system 10 to prioritize among all the completely buffered frames currently in storage to feed to the FEC decoder 60.

Furthermore, the write agent stores a physical layer signaling code (Plsc_0) of the frame, indicated as 5 in FIG. 3, in a queue 78-1 associated with carrier 0, and stores the frame length data (Frm_len_cu_0), indicated as 6 in FIG. 3, in a queue 80-1 associated with carrier 0. As can be further appreciated from FIG. 3, each of the queues 76-1 and 76-2, 78-2 and 78-2, and 80-1 and 80-2 are configured as a pair of queues, with one of the queues in each pair (76-1, 78-1 and 80-1) being associated with carrier 0 and the other queue in each pair (76-2, 78-2 and 80-2) being associated with carrier 1. Moreover, as further indicated in FIG. 3, frame sync data frame_sync_1, symbol valid data Symb-valid_1, symbol iq data Symbs_iq_1, timestamp data Timestamp_1, PLSC data Plsc_1 and frame length data Frm_len_cui are also available and used for carrier 1 in a manner similar to that discussed above for carrier 0 when carrier 1 is stored in the memory blocks in storage 58.

As the first portion of the frame of carrier 0 is stored in data block 0, the corresponding token 0, time stamp (Timestamp_0), physical layer signaling code (Plsc_0) and frame length data (Frm_len_cu_0) are stored at identical corresponding locations in their respective queues 72-1, 76-1, 78-1 and 80-1 as shown, for example, in FIG. 7. When a memory block is about to be filled and more storage is needed, as indicated by the frame length data, the write agent 74 preemptively requests a new token from the unused queue 70 for seamless memory block transition. If the process determines in Step 104 of FIG. 4 that a complete frame has not yet been received, that is, the length of the data buffered does not correspond to the length of the frame as indicated by the frame length data (Frm_len_cu_0), the process in Step 102 is repeated as discussed above, and the second portion of the frame of carrier 0 is stored in the data block represented by the new token. Similar decisions are made in Step 204 of FIG. 5 for a frame provided by demodulator 56. For simplicity in this example, it is assumed that the new token designates data block 1. Thus, the corresponding token 1, time stamp (Timestamp_0), physical layer signaling code (Plsc_0) and frame length data (Frm_len_cu_0) are stored at identical corresponding locations in their respective queues 72-1, 76-1, 78-1 and 80-1 as shown, for example, in FIG. 8.

Furthermore, as discussed above and can be appreciated from the description herein, the write agent 74 retrieves tokens from the unused queue 70 an order in which they are available in the unused queue 70. As tokens are released as discussed below, they are returned to the unused queue 70 in the order they are released. A queue management agent 82 can govern the return of the released tokens to the unused queue 70. In this example, the controller 62 can be programmed to perform the logic of the queue management agent 82 that governs the return of the released tokens to the unused queue 70. Therefore, the tokens naturally will become available in any order, and are used by the write agent 74 as available to write portions of the frame to the memory blocks as shown in FIG. 9. For example, when placed in the unused queue 70, a token's position within the unused queue 70 indicates which memory block (buffer) has been empty the longest relative to other memory blocks that were designated by tokens that have entered the unused queue 70 at a later time. Thus, the write agent 74 can use tokens in the unused queue 70 such that the memory blocks store the information beginning with the memory block that has been empty the longest according to its associated token. Alternatively, the write agent 74 can perform a lottery-type assignment of the memory blocks, in which the tokens can be stored in a memory to be randomly or otherwise selected, so that the available memory blocks can thus be randomly or otherwise selected.

When the processing determines in Step 104 of FIG. 4 that the frame provided by demodulator 54 is completely stored, in Step 106 the write agent 74 increments a frame available counter, indicated as C in FIG. 3. Similarly, when the processing determines in Step 204 of FIG. 5 that the frame provided by demodulator 56 is completely stored, in Step 206 the write agent 74 increments a similar frame available counter. The frame available counter C is visible to a read agent 84, and indicates the number of completed frames in storage 58. In this example, the controller 62 can be programmed to perform the logic of the read agent 84 that governs the read operation of a frame. The time stamp of the oldest frame in storage is also visible alongside the counter as shown in FIG. 3. Thus, the process will perform operations shown in FIG. 6 to read the complete frame with the oldest timestamp among all the complete frames from the memory blocks.

For purposes of this example as shown in FIG. 3, it will be assumed that the frame received in carrier DS0, designated as frame F0 in FIG. 2, is the first frame to be completely stored in the memory blocks of storage 58. However, it should also be noted that even if frame F0 begins to be stored before a frame F1 contained in carrier 1, the frame F1 may be completely stored in storage 58 before frame F0 is stored, especially if frame F1 is shorter as shown in Table 1. In this event, the read agent 84 can read frame F1 from storage 58 before reading frame F0 from storage. It is also possible for several frames F1 to be stored and read from storage 58 if frame F0 is especially long. In addition, if two frames (e.g., F0 and F1) are of the same length, the frame with the lower symbol rate will typically take longer to store. Therefore, even if the two frames F0 and F1 start being stored at the same time, the frame with the lower symbol rate will take longer to finish. Hence, as can be appreciated from the description herein, the read agent 84 is configured to read the frames received in carriers 0 and 1 on a first-stored, first-read basis. This first-stored, first-read policy can occur for frames of different lengths and/or different symbol rates.

In Step 300 of FIG. 6, the read agent 84 determines whether the write agent 74 has generated a frame available count signal indicating that a frame from demodulator 54 (demod 0) or a frame from demodulator 56 (demod 1) has been completely buffered in the storage 58. If no frame has yet been completely buffered, the read agent 84 waits at Step 300.

However, when the read agent 84 detects a frame available count signal, the read agent 84 will begin the processing in Step 302 to find the oldest frame stored in the storage 58, especially if more than one frame is present in storage 58 and awaiting readout at that time. That is, the read agent 84 can compare the Timestamp_0[31:0] associated with a frame from demodulator 54 and the Timestamp_1[31:0] associated with a frame from demodulator 56 to determine which frame is the oldest (e.g., which frame arrived at the storage 58 first). Naturally, if only one frame is ready for readout from storage 58, then the read agent 84 will read that frame.

In step S304, the read agent 84 reads the symbols of the oldest frame out of the buffers of storage 58. As mentioned above, FIG. 3 tracks an example of reading operations performed for reading from the buffers a frame provided by demodulator 54. However, the read agent 84 performs similar operations to read from the buffers a frame provided by demodulator 56.

As shown in FIG. 3, the read agent 84 reads the stored frame F0 from the storage 58 on a memory block by memory block (buffer by buffer) basis. The read agent 84 reads each token from the queue 72-1 and the read agent reads each portion of the frame F0 from the memory blocks having addresses designated by the tokens in the queue 72-1. These operations are also indicated as D, E and F in FIG. 3. When a memory block has been read, its token is returned to the unused queue 70 by the read agent 84. Furthermore, the read agent 84 generates the output frame sync data (Frame_sync), indicated as 7 in FIG. 3. The output frame synch data Frame_sync can be generated by the read agent 84 for one clock to create a pulse to signal that a new frame is being output from the system 50 (the serializer), and the symbols of that frame are presented to the FEC decoder 60. The read agent 84 also retrieves from queue 76-1 in this example the timestamp data (Timestamp) indicated as 8 in FIG. 3, receives the symbol iq data (Symbs_iq) indicated as 9 in FIG. 3, generates the symbol valid data (Symb_valid) indicated as 10 in FIG. 3, and retrieves from queue 78-1 in this example the PLSC data (Plsc) indicated as 11 in FIG. 3. Since these data 7 through 11 are associated with whatever frame (e.g., F0 or F1) that is being read out of the buffers, the data is not indicated with a suffix "_0" or "_1" in FIG. 3. As mentioned, the example in FIG. 3 tracks a frame provided by demodulator 54, and similar operations are performed with regard to a frame provided by demodulator 56.

In addition, the read agent 84 generates or otherwise provides demodulated channel data (dmd_chan), indicated as 12 in FIG. 3, which indicates which demodulator channel number (e.g., demodulator 54 or demodulator 56) from which the frame F0 or F1 was stored in storage 58. Thus, the dmd_chan data indicates whether the frame was included in carrier 0 or carrier 1. The read agent 84 therefore provides the read-out frame (in this example, frame F0) to the FEC decoder 60. In Step 306, the read agent 84, for example, decrements the frame available count signal associated with the frame that has been read from the buffers in storage 58. In this example, the frame available count signal indicating that a frame from demodulator 54 (demod 0) has been read out is decremented back to "0." Similarly, when a frame from demodulator 56 (demod 1) has been read out, the frame available count associated with that frame is decremented back to "0." The processing thus repeats to Step 300 to await another frame to read. As mentioned above, the buffering processes shown in FIGS. 4 and 5, and the read processing shown in FIG. 6, are performed in parallel so that frames are continuously buffered as frames are continuously being read out of the buffers.

As can be appreciated from the description herein, prioritizing the oldest frame for read-out minimizes the pipeline delay of frames. The read agent 84 monitors the counters, and if both write queues contain complete frames, then the frame (e.g., frame F0) that has the oldest time stamp is read out first at a designated clock rate, for example, two symbols at a time, or at any other suitable rate as understood in the art, because the symbols are stored side-by-side in each memory location, making both accessible per clock.

As can further be appreciated from the description herein, the organization of smaller buffers into an on-demand storage system reduces the overall memory needed. For instance, referring to Table 1 above, even though 16 small buffers are needed for the longest frame, the configuration of the system 10 makes it possible to use 34 small buffers instead of 48 small buffers to store 3 such large frames. Also, since the system 10 is flexible, the system 10 can effectively operate in environments where frame lengths vary greatly and many streams of data, possibly many more than two streams of data, arrive at the demodulators at same time.

Accordingly, the system 10 provides for efficient storage of large and small frames that avoid a wasteful one-size-fits-all approach. Since single-port RAM blocks can be used in storage 58, these type of blocks occupy less area in the ASIC than multi-port RAM blocks of the same capacity. Also, the serialization performed by the system 10 can process symbols from two independent carriers running at any combination of symbol rates up to, for example, 235 Msps, and also read out the symbols of a third frame that is already in storage 58 to the FEC decoder 60. Moreover, pipeline delay of any frame that enters the system 10 is minimized.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A system for serializing parallel streams of information comprising:
    a plurality of buffers configured to receive information from first and second demodulators as parallel streams, store the information received from the first and second demodulators and output the stored information to a decoder; and a controller configured to store a plurality of frames of information output in a parallel manner from the first and second demodulators into the plurality of buffers, and control the output of the plurality of buffers such that each of the plurality of frames is serially provided to the decoder once stored, reducing storage requirements, the controller further configured to determine when a frame of the plurality of frames has started based on a frame sync generated by the first demodulator or the second demodulator.

2. The system according to claim 1, wherein
the controller is configured to control multiple buffers to store one of the plurality of frames of the information in an order in which the information in the one of the plurality of frames is output from the first and second demodulators when a size of the one of the plurality of frames is too large to fit in a single one of the plurality of buffers, and the controller is further configured to control the multiple buffers to output the information in the one of the plurality of frames to the decoder in the order in which the information was stored in the multiple buffers.

3. The system according to claim 1, further comprising
a storage queue configured to store buffer identification information; and
wherein the controller is further configured to update the buffer identification information in the storage queue to indicate that a buffer is available to store the information when the buffer is empty.

4. The system according to claim 1, wherein
some of the plurality of frames are different sizes; and
the controller is configured to output a smaller one of the plurality of frames to the decoder when the smaller one of the plurality of frames becomes completely stored before a larger one of the plurality of frames, that began being stored before the smaller one of the plurality of frames, becomes completely stored.

5. The system according to claim 1, wherein
the plurality of buffers, the controller, the first and second demodulators and the decoder are disposed in a user terminal configured for use in a satellite communication network; and
the plurality of buffers are configured to store the plurality of plurality of frames of information that are received at the user terminal.

6. The system according to claim 1, wherein
the controller is further configured to monitor a respective storage status of each of the plurality of frames being stored in the plurality of buffers, and to output to the decoder each of plurality of frames whose respective storage status indicates completion of storage.

7. The system according to claim 6, wherein
the controller is further configured to output to the decoder one of the plurality of frames whose respective storage status first indicates completion of storage before outputting to the decoder any of the other plurality of frames whose respective storage status fails to indicate completion of storage.

8. The system according to claim 6, wherein
the controller is further configured to output to the decoder the plurality of frames in a chronological order in which their respective storage status indicates completion of storage.

9. A system for serializing parallel streams of information comprising:
a plurality of buffers configured to store information received from a demodulator and output the stored information to a decoder;
a controller configured to store a plurality of frames of information output in a parallel manner from the demodulator into the plurality of buffers, and control the output of the plurality of buffers such that each of the plurality of frames is output to the decoder once stored; and
a storage queue configured to store buffer identification information; and
the controller further configured to update the buffer identification information in the storage queue to indicate that a buffer is available to store the information when the buffer is empty, and
the controller controlling the plurality of buffers to store the information beginning with the buffer that has been empty the longest according to the buffer identification information.

10. A system for serializing parallel streams of information comprising:
a plurality of buffers configured to store information received from a demodulator and output the stored information to a decoder;
a controller configured to store a plurality of frames of information output in a parallel manner from the demodulator into the plurality of buffers, and control the output of the plurality of buffers such that each of the plurality of frames is output to the decoder once stored,
some of the plurality of frames having different symbol rates; and
the controller being configured to output, to the decoder, one of the plurality of frames with a symbol rate higher than an other one of the plurality of frames when the one of the plurality of frames becomes completely stored before the other one of the plurality of frames, that began being stored before the one of the plurality of frames, becomes completely stored.

11. A method for serializing parallel streams of information comprising:
storing in a plurality of buffers a plurality of frames of information output in a parallel manner from first and second demodulators;
determining, with a controller, when a frame of the plurality of frames has started based on a frame sync generated by the first demodulator or the second demodulator; and
controlling, by the controller, the output of the plurality of buffers such that each of the plurality of frames is serially provided to the decoder once stored, reducing storage requirements.

12. The method according to claim 11, wherein
the storing includes storing one of the plurality of frames of the information in multiple buffers in an order in which the information in the one of the plurality of frames is output from the first and second demodulators when a size of the one of the plurality of frames is too large to fit in a single one of the plurality of buffers; and
the controlling includes outputting the information in the one of the plurality of frames to the decoder in the order in which the information was stored in the multiple buffers.

13. The method according to claim 11, further comprising
storing buffer identification information in a storage queue; and
updating, by the controller, the buffer identification information in the storage queue to indicate that a buffer is available to store the information when the buffer is empty.

14. The method according to claim 11, wherein
the controlling outputs to the decoder a smaller one of the plurality of frames when the smaller one of the plurality of frames becomes completely stored before a larger one of the plurality of frames, that began being stored before the smaller one of the plurality of frames, becomes completely stored.

15. The method according to claim 11, wherein
the plurality of buffers, the controller, the first and second demodulators and the decoder are disposed in a user terminal configured for use in a satellite communication network; and
the storing stores in the plurality of buffers the plurality of frames of information that are received at the user terminal.

16. The method according to claim 11, further comprising
monitoring, by the controller, a respective storage status of each of the plurality of frames being stored in the plurality of buffers; and
wherein the controlling outputs each of the plurality of frames to the decoder whose respective storage status indicates completion of storage.

17. The method according to claim 16, wherein
the controlling outputs to the decoder one of the plurality of frames whose respective storage status first indicates completion of storage before outputting to the decoder any of the other of the plurality of frames whose respective storage status fails to indicate completion of storage.

18. The method according to claim 16, wherein
the controlling outputs to the decoder the plurality of frames in a chronological order in which their respective storage status indicates completion of storage.

19. A method for serializing parallel streams of information comprising:
storing in a plurality of buffers a plurality of frames of information output in a parallel manner from first and second demodulators;
controlling, by a controller, the output of the plurality of buffers such that each of the plurality of frames is serially provided to the decoder once stored, reducing storage requirements; and
storing buffer identification information in a storage queue;
updating, by the controller, the buffer identification information in the storage queue to indicate that a buffer is available to store the information when the buffer is empty;
the storing of the plurality of frames of information stores the information beginning with the buffer that has been empty the longest according to the buffer identification information.

20. A method for serializing parallel streams of information comprising:
storing in a plurality of buffers a plurality of frames of information output in a parallel manner from first and second demodulators;
controlling, by a controller, the output of the plurality of buffers such that each of the plurality of frames is serially provided to the decoder once stored, reducing storage requirements, and controlling the output to the decoder such that one of the plurality of frames has a symbol rate higher than an other one of the plurality of frames when the one of the plurality of frames becomes completely stored before the other one of the plurality of frames, that began being stored before the one of the plurality of frames, becomes completely stored.

* * * * *